United States Patent [19]

Martin et al.

[11] Patent Number: 5,486,372
[45] Date of Patent: Jan. 23, 1996

[54] FROZEN DAIRY PRODUCT CONTAINING POLYOL POLYESTERS

[75] Inventors: Robert W. Martin, New Town Square, Pa.; Mark S. Miller, Arlington Heights; Kevin J. Surber, Lombard, both of Ill.

[73] Assignee: Kraft Foods, Inc., Northfield, Ill.

[21] Appl. No.: 207,395

[22] Filed: Mar. 8, 1994

[51] Int. Cl.⁶ .................................................. A23G 9/04
[52] U.S. Cl. ........................... 426/565; 426/567; 426/804
[58] Field of Search ................................ 426/565–567, 426/804

[56] References Cited

U.S. PATENT DOCUMENTS

| | | | |
|---|---|---|---|
| 3,600,186 | 8/1971 | Mattson et al. | 99/1 |
| 4,626,441 | 12/1986 | Wolkstein | 426/458 |
| 4,789,664 | 12/1988 | Seligson et al. | 514/23 |
| 4,895,732 | 1/1990 | Suwa et al. | 426/660 |
| 5,084,295 | 1/1992 | Whelan et al. | |
| 5,171,602 | 12/1992 | Martin et al. | 426/567 |
| 5,358,728 | 10/1994 | Martin et al. | 426/565 |

FOREIGN PATENT DOCUMENTS

| | | |
|---|---|---|
| 236288 | 2/1987 | European Pat. Off. |
| 233856 | 2/1987 | European Pat. Off. |
| 290065 | 4/1988 | European Pat. Off. |
| 290420 | 5/1988 | European Pat. Off. |
| WO91/11109 | 8/1991 | WIPO |

*Primary Examiner*—Jeanette Hunter
*Attorney, Agent, or Firm*—Fitch, Even, Tabin & Flannery

[57] ABSTRACT

A frozen dairy dessert product having on a non-flavored basis, from about 3% to about 20% of a polyol fatty acid polyester, from 0% to about 8% of a triglyceride fat, from about 0.3% to about 0.7% of an emulsifier, from about 10% to about 19% of milk solids not fat, from about 6% to about 15% of a carbohydrate sweetener, such as sucrose, from 0% to about 15% (dry solids basis) of low dextrose equivalent corn syrup solids having a dextrose equivalent (DE) of from about 20 to about 36, from 0% to about 6% (dry solids basis) of high DE corn syrup solids having a DE of from about 36 to about 95, from 0% to 6% (dry solids basis) of dextrin having a DE of less than about 20, from 0% to about 3% of starch and from 0% to about 0.5% stabilizer.

A white mix containing all of the ingredients is prepared by adding the ingredients, including the polyol polyester to heated water with agitation. The white mix is pasteurized and homogenized at high pressure of above about 5000 psig to provide a pre-blend of the frozen dairy dessert components.

20 Claims, No Drawings

FROZEN DAIRY PRODUCT CONTAINING POLYOL POLYESTERS

FIELD OF THE INVENTION

The present invention relates generally to a reduced calorie frozen dessert product containing polyol polyesters which has organoleptic characteristics, stability and body corresponding to those of milk fat-containing ice cream products. More particularly, the present invention relates to a simple and inexpensive formulation and method for producing a non-fat or reduced fat frozen dairy dessert product which has surprising stability, flavor, mouthfeel and body characteristics.

BACKGROUND OF THE INVENTION

Physically, ice cream is the most complex of dairy products, being a three-phase system consisting of air, liquid and solids. The desirable structure of ice cream, expressed in terms of body and texture, is due to the physical effects of homogenization, whipping and freezing and to the type, source and pretreatment of the mix ingredients. Ice cream is a complicated foam, the continuous phase representing a partly frozen emulsion, the ice crystals and the solidified fat globules being embedded in the unfrozen water phase. Typically, in conventional ice cream formulations, the higher the fat level, the more pleasing and appetizing the texture and flavor are considered to be. In accordance with the Standards of Identity of the Food and Drug Administration of the United States, ice cream must contain at least 10% of milk fat. The texture, flavor and mouthfeel characteristics of ice cream, containing at least 10% milk fat, are considered substantially superior to the texture and flavor of frozen desserts containing lower levels of fat, producing an overall consumer preference which is substantially higher than very low fat or non-fat frozen dessert products which seek to mimic the characteristics of ice cream.

There has been substantial technical effort directed to the development of low fat and non-fat frozen desserts in order to provide consumers with products having reduced calories and reduced fat content while preserving the organoleptic appeal of fat-containing frozen dessert products. Such efforts include the use of various types of indigestible fat-like materials, such as sucrose polyesters and polyglycerol polyesters which pass through the digestive system without absorption and without contributing calories or the effects of saturated fats, such as butterfat. The use of sucrose polyesters in the manufacture of frozen desserts has proven to be difficult. For example, PCT Application WO91/11109 emphasizes the necessity of forming a preemulsion of the sucrose polyester, prior to combining the preemulsion with the remaining frozen dessert ingredients.

Early efforts to provide non-fat frozen dairy desserts were directed to simple formulations wherein the fat normally present in ice cream was replaced with additional non-fat milk solids. U.S. Pat. No. 3,510,316 to Decker is representative of such efforts. The Decker patent is directed to a non-fat frozen dairy dessert which allegedly has comparable body, texture and flavor which are comparable to high butterfat containing frozen dairy dessert of the same total solids content as ice cream. The solids content normally provided by butterfat is replaced by a combination of increased non-fat milk solids and low dextrose equivalent (DE) corn syrup solids. Non-fat milk solids content are present in the range of 10% to 19%, sugar is present in the range of 9% to 13%, corn syrup solids are present in the range of 9% to 13%, stabilizer is present in the range of 0.2% to 0.5% and an emulsifier is present in the range of 0.04% to 0.15%. The non-fat frozen dairy dessert proposed in the Decker patent is highly desirable in that the contents of the dairy dessert are substantially natural products normally found in ice cream and highly modified or complicated materials are not required in the product. However, the non-fat frozen dairy dessert proposed by the Decker patent has not met with commercial success due to short shelf life and stability.

U.S. Pat. No. 5,171,602 to Martin, et al. is an improvement of the non-fat frozen desserts of the Decker patent. The non-fat frozen desserts of the Martin, et al. patent utilize unmodified food starch to improve the texture and stability of the frozen dessert.

Efforts to produce non-fat frozen dairy dessert have grown increasingly more complex and numerous efforts have been expended to provide a non-fat frozen dairy dessert containing milk solids which has comparable body-texture and flavor to ice cream containing 10% milk fat. Substantial work has been carried out over an extended period of time with bulking agents, such as powdered and microcrystalline cellulose, in a reduced fat food products including frozen dessert formulations. For example, U.S. Pat. No. 3,067,037, 3,141,875, 3,157,518, 3,251,824, 3,388,119, 3,539,365, 3,573,058, 3,684,523, 3,947,604, 4,199,368, 4,231,802, 4,346,120, 4,400,406, 4,427,701 and 4,421,778 relate to use of various types of cellulose in frozen dessert products. However, as the fat content is reduced in frozen desserts containing substantial levels of microcrystalline cellulose, adverse organoleptic effects such as a mouth-coating or astringency sensation, and a lack of a well-rounded organoleptic sensation corresponding to that provided by conventional milk fat-containing ice cream products, tend to become more pronounced.

U.S. Pat. No. 4,855,156 to Singer, et al., is directed to frozen whipped dessert products wherein part or all of the milk fat in an ice cream mix formulation is replaced by a macro-colloid comprising substantially non-aggregated particles of denatured protein having in a dry state a mean diameter particle size distribution ranging from about 0.1 micron to about 2.0 micron, with less than about 2% of the total number of particles exceeding 3.0 microns in diameter and wherein the majority of particles are generally spheroidal as viewed at about 800 power magnification under a standard light microscope. The particles in a hydrated state forming the macro-colloid have a substantially smooth, emulsion-like organoleptic character. Proteinaceous macro-colloids are derived from undenatured substantially soluble proteins obtained from animal, vegetable and microbial sources, such as dairy whey, egg white albumin, soy and bovine serum albumin protein sources.

U.S. Pat. No. 4,400,405 to Morley is directed to a whipped emulsified frozen food of low fat content which is extrudable in continuous form at temperatures in the range of 0° F. to 10° F. for serving by extrusion at home freezer temperatures. The frozen food product of the Morley patent consists essentially of a controlled emulsion of protein, water, sugars, stabilizers and emulsifiers. The protein accounts for 3% to 7%, the water accounts for 54% to 60%, the sugars account for 25% to 29% and the emulsifiers and stabilizers account for 1.1% to 2.7%, all by weight of the product. The Morley patent relies upon providing a saccharide system containing various sugars, a stabilizer system employing at least one stabilizer from each of at least three groups of stabilizers and an emulsifier system having particular emulsifiers to provide an extrudable product at refrigeration temperatures.

U.S. Pat. No. 4,308,294 to Rispoli, et al. is directed to an oil-free, oil-replacement composition having an oily mouth-feel texture and lubricity used in products such as frozen dairy desserts. The composition is formed by hydrating and whipping a protein and a cellulose gum to form a protein phase, hydrating an acid stable modified starch and an acid to form an acid phase, then heating to swell the starch while minimizing bursting, followed by cooling and mixing the protein phase and the acid phase.

U.S. Pat. No. 4,840,813 to Greenberg, et al. is directed to low and non-fat aerated frozen dairy desserts which are alleged to have the organoleptic characteristics of premium, high fat ice cream but which include 0.1% to 7% by weight of fat. The dessert compositions essentially contain 20% to 25% milk solids non-fat, 1% to 7% whey protein concentrate, corn syrup solids, sucrose and water. The whey protein to casein weight ratio ranges from 1:0.5 to 4.0. The Greenberg, et al. patent utilizes high temperature pasteurization to denature at least about 50% of the whey protein of the skim milk utilized in the manufacture of the frozen dairy dessert product.

U.S. Pat. No. 4,510,166 to Lenchin is directed to the use of converted starches, such as dextrins, acid-converted starches, enzyme-converted starches and oxidized starches, to replace fat in food products, such as mayonnaise and ice cream.

U.S. Pat. No. 2,590,077 to Lolkema is directed to the use of a highly modified and unusual starting product in a frozen dessert product. The starch product of the Lolkema patent is made by mixing starch (1000 parts by weight) with technical monochloroacetic acid (150 parts by weight) according to Dutch Patent 55,779, which corresponds to U.S. Pat. No. 2,459,108 to Lolkema. A mixture of starch, monochloroacetic acid and water containing ½–2 parts by weight of water per part by weight of the polysaccharide is passed over a rotating drum heated to a temperature of about 100°–180° C. on which the mixture is dried in a period varying from a few seconds to a few minutes. The ethers and esters obtained according to the '108 Lolkema patent consist of small-thin flakes which are removed from the drum after drying, which flakes will readily dissolve in water to homogeneous solution. The Lolkema patent states that the etherified or esterified starch must be produced by the method described to provide the starch in flake form in order for the modified starch to be effective for the stated purpose.

Accordingly, it is an object of the present invention to provide reduced calorie frozen dessert products having organoleptic, stability and body features comparable to those of fat-containing frozen dessert products. It is also an object of the invention to provide reduced calorie frozen dessert formulations which have a high degree of shelf and flavor stability. It is a further object of the present invention to provide reduced calorie frozen dairy dessert products from natural materials which have properties comparable to frozen dairy dessert products having more than 7% butterfat.

These and other objects will become more apparent from the following detailed description.

SUMMARY OF THE INVENTION

The present invention is directed to methods for preparing nutritious, low-calorie, frozen dessert products having desirable texture and flavor characteristics similar to high milk fat content frozen desserts, such as ice cream, and having substantial shelf and flavor stability with a creamy texture. The present invention is also directed to frozen dairy dessert products which contain reduced levels of triglyceride fats.

The frozen dairy dessert product of the present invention comprises on a non-flavored basis, from about 3% to about 20% of a polyol fatty acid polyester, from 0% to about 8% of a triglyceride fat, from about 0.3% to about 0.7% of an emulsifier, from about 10% to about 19% of milk solids not fat', from about 68 to about 15% of a carbohydrate sweetener, such as sucrose, from 08 to about 15% (dry solids basis) of low dextrose equivalent corn syrup solids having a dextrose equivalent (DE) of from about 20 to about 36, from 08 to about 6% (dry solids basis) of high DE corn syrup solids having a DE of from about 36 to about 95, from 0% to 68 (dry solids basis) of dextrin having a DE of less than about 20, from 0% to about 3% of starch and from 0% to about 0.5% stabilizer.

In the method of the invention, a white mix containing all of the ingredients is prepared by adding the ingredients, including the polyol polyester to heated water with agitation. The white mix is pasteurized and homogenized at high pressure of above about 5000 psig to provide a pre-blend of the frozen dairy dessert components. The pre-blend may be held for a predetermined period of time before it is then aerated and frozen to produce a frozen dessert product having a density in the range of from about 3.5 pounds to about 6 pounds per gallon.

DETAILED DESCRIPTION OF THE INVENTION

In its composition aspect, the present invention provides a milk protein based, aerated dessert which has the organoleptic characteristics of high fat ice cream. Also, the present invention provides liquid mixes from which these desserts can be prepared by conventional agitated freezing. The frozen dessert compositions comprise a polyol polyester, milk solids non-fat, sweetener and an emulsifier. Optionally, the frozen dessert compositions may contain a triglyceride fat, a stabilizer, low D.E. corn syrup solids, high D.E. corn syrup solids, dextrins, starch and artificial sweeteners. In its method aspect, the invention resides in the process for preparing the frozen dairy desserts and liquid mixes therefor from the components of the composition to provide a frozen, aerated, dairy based dessert product having surprising qualities in view of the simple and inexpensive nature of the components used in the preparation thereof. Each of the composition components and essential characterizing product features and preparation steps are described in detail below.

Throughout the Specification and Claims, percentages and ratios are by weight based on the frozen dessert product and temperatures are in degrees Fahrenheit unless otherwise indicated.

In an important embodiment, the composition of the present invention which can be used to prepare non-fat frozen aerated dessert products generally has the following components as set forth in Table I.

TABLE I

| Ingredient | Range Wt. % |
|---|---|
| Polyol polyester | 3–7 |
| Milk Solids Not-fat | 12–16 |
| Sucrose | 10–14 |
| Corn Syrup Solids (20-36DE) (dry solids basis) | 10–14 |
| Unmodified Starch | 0.75–2.0 |
| Stabilizer | 0.1–0.5 |

TABLE I-continued

| Ingredient | Range Wt. % |
|---|---|
| Emulsifier | 0.3–0.7 |
| Water | q.s. |

The intermediate melting polyol polyesters useful in the present invention are edible, wholly or partially nondigestible polyol fatty acid polyesters having at least 4 fatty acid ester groups, wherein the polyol (e.g., a sugar, a sugar alcohol or a sugar derivative such as an alkyl glycoside) contains at least 4 (preferably from 4 to 8) hydroxy groups prior to esterification, and wherein each fatty acid group has from 2 to 24 carbon atoms. Preferably, the polyol polyesters have a viscosity of from about 5 to about 100 poise. Most preferred polyol polyesters have a viscosity of from about 20 to about 60 poise.

The intermediate melting polyol polyesters have a high liquid/solid stability inasmuch as the liquid portion of these polyol polyesters does not readily separate from the solid portion. At 100° F. (37.8° C.), these intermediate melting polyol polyesters have a liquid/solid stability of at least about 30%, preferably at least about 50%, more preferably at least about 70%, and most preferably at least about 80%. The polyol polyesters desirably have a Solid Fat Content at 98.6° F. (37° C.) of about 20% or less. Particularly, preferred SFC values at 98.6° F. (37° C.) are in the range of from about 4 to about 20%, and most preferably in the range of from about 6 to about 15%.

Preferred intermediate melting polyol polyesters for use in the present invention are selected from sugar fatty acid polyesters and sugar alcohol fatty acid polyesters. The term "sugar" is used herein in its generic sense to include monosaccharides, disaccharides, oligosaccharides and polysaccharides. The term "sugar alcohol" is used in its generic sense to refer to the reduction product of sugars wherein the aldehyde or ketone group has been reduced to an alcohol. Preferred sugars or sugar alcohols contain 4 to 8 hydroxy groups prior to esterification. The fatty acid ester compounds are prepared by reacting a sugar or sugar alcohol with fatty acids as discussed below.

Examples of suitable monosaccharides are those containing 4 hydroxy groups such as xylose, arabinose, ribose and methylglucoside; the sugar alcohol derived from xylose, i.e., xylitol, is also suitable. The monosaccharide erythrose is not suitable since it only contains 3 hydroxy groups; however, the sugar alcohol derived from erythrose, i.e., erythritol, contains 4 hydroxy groups and is thus suitable. Among 5 hydroxy-containing monosaccharides that are suitable for use herein are glucose, mannose, galactose, fructose and sorbose. A sugar alcohol derived from sucrose, glucose or sorbose, e.g., sorbitol, contains 6 hydroxy groups and is also suitable as the alcohol moiety of the fatty acid ester compound. Examples of suitable disaccharides are maltose, lactose and sucrose, all of which contain 8 hydroxy groups.

In preparing the intermediate melting polyol polyesters useful in the present invention, the polyol (e.g., a sugar or sugar alcohol compound such as those identified above) is esterified with fatty acids having from 4 to 24 (preferably from 8 to 22), carbon atoms. Examples of such fatty acids are butyric, caproic, caprylic, capric, lauric, myristic, myristoleic, palmitic, palmitoleic, stearic, oleic, elaidic, ricinoleic, linoleic, linolenic, eleostearic, arachidic, behenic and erucic. The fatty acids can be derived from suitable naturally occurring or synthetic fatty acids and can be saturated or unsaturated, including positional and geometric isomers. The polyol polyesters of this invention are usually, but not necessarily, mixed esters of fatty acids, rather than esters of a single type of fatty acid.

Fatty acids per se or naturally occurring fats and oils can serve as the source for the fatty acid portion of the polyol fatty acid polyester. For example, rapeseed oil provides a good source for $C_{22}$ fatty acid. $C_{16}$–$C_{18}$ fatty acids can be provided by tallow, soybean oil or cottonseed oil. Shorter chain fatty acids (e.g., $C_{12}$–$C_{14}$ fatty acids) can be provided by coconut, palm kernel or babassu oils. Corn oil, lard, olive oil, palm oil, peanut oil, safflower seed oil, sesame seed oil and sunflower seed oil, are examples of other natural oils which can serve as the source of the fatty acid component. The fatty acids can be saturated, unsaturated or mixtures thereof. The unsaturated fatty acids can include positional and geometric isomers (e.g., cis and trans isomers) or mixtures thereof. In order to provide the required physical Properties, the polyols are preferably esterified with particular kinds of fatty acids. Preferably, at least about 70% of the fatty acids are selected from the group consisting of lauric, myristic, palmitic, stearic, oleic and elaidic ($C_{18:1}$), linoleic ($C_{18:2}$) and behenic acids and mixtures thereof.

Iodine Value is a measure of the degree of unsaturation of fatty acids that are esterified on the polyol. The intermediate melting polyol polyesters usually have an Iodine Value of from about 10 to about 70. A preferred group of these polyesters have Iodine Values of from about 15 to about 60. These preferred polyesters also have a fatty acid composition characterized by: (a) not more than about 0.6% fatty acids have 3 or more double bonds; (b) not more than about 20% fatty acids have 2 or more double bonds; and (c) not more than about 35% of the fatty acids double bonds are trans-double bonds.

Preferred fatty acid compositions for these preferred polyesters are: less than about 12% palmitic acid; from about 30 to about 70% stearic acid; from about 15 to about 60% oleic and elaidic ($C_{18:1}$) acids; less than about 12% linoleic ($C_{18:2}$) acid; and less than about 0.6% linolenic ($C_{18:3}$) acid.

Most preferred fatty acid compositions for these preferred polyesters are: less than about 12% palmitic acid; from about 40 to about 70% stearic acid; from about 20 to about 50% oleic and elaidic ($C_{18:1}$) acid; less than about 12% linoleic ($C_{18:2}$) acid; and less than about 0.6% linolenic ($C_{18:3}$) acid.

With regard to reduced calorie benefits, a characterizing feature of the intermediate melting polyol polyesters useful in the present invention is that they predominantly contain at least 4 fatty acid ester groups. Polyol fatty acid polyester compounds that contain 3 or less fatty acid ester groups are digested in the intestinal tract much in the manner as ordinary triglyceride fats, but polyol fatty acid polyester compounds that contain 4 or more fatty acid ester groups are digested to a lesser extent and thus have the desired reduced calorie properties.

Highly preferred intermediate melting polyol polyesters are sucrose fatty acid polyesters. Preferred sucrose fatty acid polyesters have the majority of their hydroxy groups esterified with fatty acids. Preferably at least about 85% and most preferably at least about 95%, of the esters are octaesters, heptaesters, hexaesters or mixtures thereof. Preferably, no more than about 40% of the esters are hexaesters or heptaesters, and at least about 60% of the esters are octaesters. Most preferably at least about 70% of the esters are octaesters. It is also most preferred that the polyesters have a total content of penta- and lower esters of not more than about 3%.

The intermediate melting polyol polyesters suitable for use herein can be prepared by a variety of methods well known to those skilled in the art. These methods include: transesterification of the polyol with methyl, ethyl or glycerol fatty acids esters using a variety of catalysts; acylation of the polyol with a fatty acid chloride; acylation of the polyol with a fatty acid anhydride; and acylation of the polyol acid with a fatty acid, per se. As an example, the preparation of sugar and sugar alcohol fatty acid esters is described in U.S. Pat. Nos. 2,831,854, 3,963,699, 4,517,360 and 4,518,772.

The preferred intermediate melting polyol polyesters described above having maximum levels of fatty acids with two or more double bonds, as well as trans-double bonds, can be prepared using two source oil streams. For example, a sugar or sugar alcohol is esterified with a mixture of fatty acids from a primary source oil and a fully hydrogenated secondary source oil in a ratio of between about 20:80 and about 80:20, preferably between about 50:50 and about 75:25. The primary source oil has an Iodine Value between about 65 and about 100, preferably between about 75 and about 95, and the fully hydrogenated oil has an Iodine Value between about 1 and about 12, preferably between about 1 and about 8. The partially hydrogenated portion is derived by a catalytic process which provides low levels of polyunsaturated fatty acids, and low levels of trans configured double bonds.

Triglyceride oils particularly suitable for providing fatty acids and for optional inclusion in the frozen dessert compositions of the invention for preparing polyol polyesters include unhardened, hardened and partially hardened canola, corn, safflower, high oleic safflower, soybean, peanut, sunflower, high oleic sunflower oils and butterfat. Mixtures of these oils are also suitable.

The polyol polyester may be used to replace all or a portion of the milk fat present in ice cream. Ice cream generally contains not less than about 10% milk fat. The frozen dessert products of the present invention may also contain from about 0% to about 10% of a triglyceride fat, and preferably from about 0% to about 8% of a triglyceride fat, preferably milk fat.

The milk solids not fat may be provided from a variety of sources, including skim milk, condensed skim milk having from about 26% to 35% solids, and dried skim milk. If the ice cream is to have any triglyceride fat, the triglyceride fat can be provided by fat containing dairy products, such as milk and cream. The milk solids not fat are present in the frozen dessert at a level of from about 10% to about 19%. At the higher end of the useable range, i.e., at a level of from about 14% to about 19%, it is preferred to treat the milk solids not fat to reduce the level of lactose. Lactose levels can be reduced by subjecting skim milk or whole milk to membrane treatment, such as ultrafiltration or reverse osmosis. The retentate obtained from membrane treatment has a lactose level of from about 0.7% to about 2.0%. Lactose reduction can also be effected by inoculating skim milk or whole milk with lactose and incubating the milk for a period of about 2 to 4 hours to break down the lactose into its component sugars, glucose and galactose.

Emulsifiers are preferably present in the frozen desserts at a level of from about 0.3% to about 0.7%. Preferred emulsifiers are monoglycerides, diglycerides and polysorbate esters. The lower sucrose fatty acid esters, i.e., the mono-, di- and tri- esters, are known emulsifiers which are particularly compatible with the polyol fatty acid esters used in the frozen dessert compositions of the invention. The monoglyceride can be used in essentially pure form but is more often obtained as a mono- and diglyceride mixture containing a small amount of triglyceride material. The monoglyceride content of commercially available products may vary from 40% to 98%, and since these emulsifiers are usually derived from hydrogenated vegetable and animal fats, palmitic and stearic acid esters predominate. A few commercial products contain high levels of glyceryl monooleate. The effectiveness of the emulsifier depends on the percentage of monoglyceride and on the particular fatty acids that are present. There is an inverse relationship between carbon chain length of the fatty acid and the stiffness produced in ice cream, capric and lauric acid monoglycerides being more effective in this respect than glyceryl monopalmitate or monostearate. Monoglycerides containing unsaturated fatty acid are more effective than saturated monoglycerides.

The polysorbate type emulsifiers are the polyoxyethylene derivatives of sorbitan tristearate and sorbitan monooleate. These emulsifiers are more hydrophilic than the monoglycerides and are used at much lower levels since they are especially effective in providing stiffness to the frozen dessert ice cream as it leaves the freezer.

The corn syrup solids used in the compositions of the present invention are low dextrose equivalent (D.E.) corn syrup. Low D.E. corn syrup has a high viscosity and can be used in a water phase at relatively high concentrations. Corn syrup is produced from a suspension containing 35%–40% of corn starch in water. The suspension is fed to an autoclave and sufficient hydrochloric acid is added to provide a concentration of about 0.02 NHCl. The autoclave is heated by introduction of steam until a temperature of about 150° C. is reached. The mixture is held at this temperature for a period of time sufficient to produce the required degree of hydrolysis. This is specified analytically by the percentage of reducing sugar in the dry solids of the hydrolysate and ranges from about 20% to about 60% depending upon the type of product desired. The contents of the autoclave are then neutralized to pH 4–5 by the addition of soda ash. The neutralized hydrolysate is further refined by filtration and treatment with activated carbon and is then evaporated to provide a heavy syrup. The final syrup contains about 75%–80% dry solids. Corn syrup may also be dried to form corn syrup solids with moisture contents of approximately 5%.

Corn syrup is specified on the basis of reducing sugar content on a dry basis. This is designated as dextrose equivalent or D.E., when calculated as dextrose. Corn syrup is marketed with various concentrations of solids usually determined by density determination and designated in degrees Baume' (Be'). Typically, corn starch syrups are marketed at densities of 41°–45° Be'.

In accordance with the present invention, low D.E. corn syrup solids are preferably used in the compositions of the invention. By low D.E. corn syrups is meant those corn syrups having a D.E. of from about 20 to about 36. Such low D.E. corn syrups have a very high viscosity and relatively low sweetness. The relatively low sweetness is the result of having low levels of reducing sugars, such as dextrose and maltose and relatively high levels of non-reducing sugars such a trisaccharides and higher saccharides. The low D.E. corn syrup is preferably used in the compositions of the invention at a level of from about 10% to about 14% on a dry solids basis. Lower levels of low D.E. corn syrup solids, to as low as about 6%, may be used when high D.E. corn syrup (D.E. above 36 to about 95) is used at levels up to about 6% or dextrins are used at levels up to about 6%.

The corn syrup solids used in the compositions of the present invention are to be distinguished from dextrins. Dextrins are a polymer of d-glucose which is intermediate in complexity between starch and maltose. The term "dextrin" means a product obtained by hydrolysis of starch to provide a product having a very low D.E. of less than about 20.

The individual ingredients comprising the compositions of the invention may be varied over a wide range by adjusting the level of other ingredients. For example, the level of sucrose may be greatly reduced if high D.E. corn syrup solids are used. The sucrose may be completely replaced by use of an artificial sweetener.

Starch may optionally be used to provide improved stability during frozen storage. If starch is used, the starch may be any unmodified or modified food starch, such as corn starch, potato starch, rice starch or tapioca starch. The starch used in the compositions of the present invention is preferably unmodified cornstarch, either a native or a cold-water swelling cornstarch. The cornstarch is preferably cold-water swelling to provide further ease in the preparation of the white mix of the invention which is used to prepare the aerated frozen dessert products, although native ungelatinized starch may be used. When native starch is used, it is first cooked to gelatinize the starch prior to use.

Modified starches are described in 21 C.F.R. §172.892. The term "modified starch" is readily understood by those skilled in the art and modified starches are suitable for use in the present invention.

Stabilizers are not required in the non-fat frozen dessert products of the invention. However, the use of stabilizers may improve the texture and stability of some compositions. The stabilizers useful in the present invention are those well recognized and understood for use in the manufacture of ice cream. Such stabilizers include carboxymethyl cellulose, alginates, xanthan gum, carob bean gum, guar gum, locust bean gum, carrageenan, gum tragacanth, and gelatin. In addition to those stabilizers which are well known for the use in the manufacture of ice cream, a preferred stabilizer for use in the present invention is pectin. While pectin has been described for use in the manufacture of frozen desserts, such as set forth in U.S. Pat. No. 4,874,627 to Greig and U.S. Pat. No. 5,171,602 to Martin, et al., the use of standard pectins in the manufacture of dairy products are not well recognized and is not recommended by manufacturers of pectin. The use of pectin as the stabilizer in the present invention is particularly preferred since pectin is a natural product derived from fruit.

In an important embodiment of the present invention, a polyphosphate complexing salt is also used in the formulation of the frozen dairy dessert of the invention. As used herein, the term "polyphosphate complexing salt" refers to sodium and potassium phosphate salts which have at least two phosphate molecules. Suitable polyphosphate complexing salts include pyrophosphates, tripolyphosphates, long chain polyphosphates having from 4 to 14 phosphate moieties, such as sodium hexametaphosphate, glassy phosphates and Graham's salt, and cyclic phosphates, such as sodium trimetaphosphate and sodium tetrametaphosphate. The use of the polyphosphate emulsifying salt provides a frozen dessert which is creamier and has less crystal growth during accelerated temperature abuse cycling. If used, the polyphosphate complexing salt is present at a level of from about 0.03% to about 0.3%.

In the method of the present invention, the water required for the manufacture of the white mix is added to a kettle provided with an agitating device. The preferred agitating device is a Lanco mixer which is provided with a rotating disc at the bottom of the mixer bowl. The disc is provided with a series of upwardly extending projections which causes the mixer to operate in the manner of a large blender. The Lanco mixer is preferably operated at its highest speed.

The water is heated to a temperature of from about 100° F. to about 160° F., preferably about 150° F. The order of addition of the individual ingredients is not important. The ingredients may all be added to the heated water at the same time, provided that any starch used is a cold-water swelling starch or has been gelatinized by cooking. A white mix is formed after a period of agitation of from about 10 to about 40 minutes. The following order of addition, however, is preferred.

The stabilizer and cold-water swelling starch are added to the heated water and agitation is commenced and continued for a period of from about 2 to about 15 minutes, preferably about 10 minutes. The sugar is then added and agitation is continued for an additional 5 to 10 minutes. Dry corn syrup solids or corn syrup, condensed skim milk, the polyphosphate and dry milk solids not-fat (if used) are added and agitation is continued for an additional 2 to 10 minutes, preferably 5 minutes. The polyol polyester emulsifier and any triglyceride fat are added last and mixing is continued for an additional 2 to 10 minutes, preferably about 5 minutes to provide the white mix. The white mix is then pasteurized under suitable time and temperature conditions, preferably at a temperature of from about 180° F. to about 225° F. for 30 to 60 seconds, most preferably about fifty seconds.

The heated white mix is then subjected to high pressure homogenization in a high pressure homogenizer, such as a Rannie homogenizer. High pressure homogenization is a critical step in the method of the present invention to provide a polyol polyester containing frozen dessert. The high pressure homogenization step takes place at a pressure of at least 5,000 psig, preferably in the range of from about 8,000 to about 15,000 psig. The high pressure homogenization step obviates the need for preparing a preemulsion of the polyol polyester.

The white mix is then cooled to a temperature of 160° F. to 180° F. and is decanted into containers and cooled to about 40° F. The white mix is held at 40° F. for a period of about 6 to about 100 hours. The cooled white mix is then aerated under agitating conditions in a conventional ice cream freezer. The aerated ice cream mix has an overrun of from about 80% to about 100% and exits from the ice cream freezer at a temperature in the range of from about 18° F. to about 23° F. The aerated ice cream is then placed in containers and hardened at a temperature in the range of from about −10° F. to about −25° F. for a period of from about 20 hours to about 40 hours, prior to distribution.

In another embodiment of the invention, two blends of polyol polyester are prepared. The first blend contains from about 50% to about 75% of the total polyol polyester, from about 40% to about 60% of the milk solids not fat, from about 40% to about 60% of the sweetener and all of the emulsifier. The second blend contains the remaining components. The first blend is subjected to high pressure homogenization, as previously described. The second blend is subjected to simple mixing. The two blends are then combined at a ratio of the first blend to the second blend of from about 0.6:1 to about 1.4:1. The combined blends are then subjected to low pressure homogenization at less than about 3,000 psig. In this embodiment, the amount of destabilized polyol polyester provided by the second blend enhances creaminess, mouthfeel and stability after the freezing step.

The frozen dairy dessert of the present invention is stable, has an extended shelf life and has no off flavors after storage. There is no significant collapse of the frozen dairy dessert of the invention after significant periods of storage and/or temperature abuse for a period of up to 6 weeks and no lactose crystallization (sandiness) is observed. The frozen dairy dessert of the invention has a good mouthfeel and has the organoleptic properties of a frozen dairy dessert containing substantial levels of milk fat. The frozen dairy dessert products of the present invention improve in taste with hardening.

The following examples further illustrate various features of the present invention that are intended to in no way limit the scope of the invention which is defined in the appended Claims.

EXAMPLE 1

A 150 lb. batch of vanilla ice cream was made using the following components at the indicated levels:

| Ingredient | % by Weight |
| --- | --- |
| Sucrose polyester (60% palmitic fatty acid, 40% stearic acid) | 5.0 |
| Milk solids not fat | 16 |
| Cold-water swelling unmodified starch - Staley Miragel ™ | 0.75 |
| Corn syrup solids 25 DE, 42 Baume' | 7.0 |
| Sucrose | 12 |
| Pectin | .12 |
| Monoglyceride emulsifier | .5 |
| Water | q.s. 100% |

The water was heated to 150° F. and placed in a Lanco mixer. The Lanco mixer was set to the highest speed and the pectin, starch and sucrose were added. After 10 minutes of agitation the corn syrup solids and milk solids not fat in the form of 30% solids condensed skim milk were added. After 3 minutes of agitation, the sucrose polyester and monoglyceride emulsifiers were added. After 2 minutes of additional mixing a white mix was formed. The white mix was HTST pasteurized at 220° F. for 50 seconds. The white mix was homogenized in a Rannie homogenizer at a pressure of 10,000 psig and cooled to 40©F. for 20 hours. 230 ml of natural vanilla flavor was added. The white mix was then pumped to a scraped wall ice cream freezer. The white mix exited from the freezer at a temperature of 22° F. and 100% overrun. The aerated frozen white mix was placed in containers and hardened at −20° F. for 24 hours to provide vanilla ice cream having organoleptic properties similar to ice cream made with 5% butterfat.

EXAMPLE 2

The method of Example 1 was used to prepare 100 pounds each of the following frozen dessert formulations:

| Ingredient | Control (No polyphosphate) | Sample #1 | Sample #2 |
| --- | --- | --- | --- |
| Sucrose polyester of Example 1 | 5.0 | 5.0 | 5.0 |
| Cold-water swelling unmodified starch Miragel ™ | 1.5 | 1.5 | 1.5 |
| Milk solids not-fat from condensed skim milk (30% solids) | 10.14 | 10.14 | 10.14 |
| Corn syrup, 25 D.E. | 13.65 | 13.65 | 13.65 |
| 42 Baume' | | | |
| Pectin | .1 | .1 | .1 |
| Polyphosphate* | 0 | .1 | .05 |
| Sucrose | 11.4 | 11.4 | 11.4 |
| Water | qs 100% | qs 100% | qs 100% |

*Yoha ® P-60 from B. K. Ladenburg, Cresskin, New Jersey

Samples 1 and 2 containing 0.1% and 0.05%, respectively, of a polyphosphate had a creamier mouthfeel and exhibited less crystal formation after temperature abuse treatment represented by 3 weeks of cycling from 0° F. −20° F. and 20° F. to 0° F. over periods of 12 hours.

EXAMPLE 3

The following method was used to prepare a polyol polyester containing frozen dessert:

| Blend A | Blend B |
| --- | --- |
| 3.0% sucrose polyester* | 7.0% sucrose polyester* |
| 13% Milk solids not fat | 13% Milk solids not fat |
| 12% sucrose | 12% sucrose |
| 29% corn syrup solids | 1.0% emulsifier |
| 2.12% Miragel | '67% $H_2O$ |
| 0.24% pectin | |
| 35% $H_2O$ | |

*Same as Example 1

Step 1 — Blend B is homogenized in a high pressure homogenizer at a pressure of 10,000 psi.

Step 2 — Blend A is prepared in a Lanco mixer in 120° F. water and Blend B is added to provide the final composition:

| Blends A/B 1:1 ratio |
| --- |
| 5.0% sucrose polyester of Example 1 |
| 13% milk solids not fat (MSNF) |
| 12% sucrose |
| 14.5% corn syrup solids (25 DE) |
| 1.06% Miragel |
| 0.12% pectin |
| 0.5% emulsifier |

Step 3 — The combination of Blends A and B are then homogenized below 500 psi to further mix Blends A/B. This enhances destabilized fat for the freezing step and enhances creaminess, mouthfeel and stability.

EXAMPLE 4

The method of Example 1 was used to prepare 100 pounds of the following frozen dessert composition.

| Ingredient | % By Weight |
| --- | --- |
| Sucrose polyester of Example 1 | 7.0% |
| Butterfat | 3.0% |
| MSNF | 13.0% |
| Sucrose | 12.0% |
| Stabilizer (50:50 blend of locust bean gum and carboxymethylcellulose) | 0.25% |
| Corn Syrup Solids (25 DE) | 7.0% |
| Monoglyceride Emulsifier | 0.3% |

The frozen dessert made from the above composition had organoleptic properties similar to ice cream having 10% butterfat.

What is claimed is:

1. A process for preparing a frozen dessert product comprising:
   (a) forming a mixture of from about 3% to about 20% polyol fatty acid polyesters having at least 4 fatty acid ester groups, from 0 to about 10% of triglyceride fat, from about 10% to about 19% of non-fat milk solids, from 0 to about 15% of corn syrup solids, from about 6% to about 15% of a carbohydrate sweetener, from 0 to about 0.7% of a stabilizer, from about 0.003% to about 0.007% of an emulsifier and from about 50% to about 75% water;
   (b) subjecting said mixture to homogenization at a pressure of at least about 5,000 psig; and
   (c) freezing said homogenized mixture with aeration to provide a frozen dessert product.

2. A process in accordance with claim 1 wherein said polyol fatty acid polyesters are derived from polyols selected from the group consisting of sugars and sugar alcohols containing from 4 to 8 hydroxy groups and each of said fatty acid ester groups contains from 8 to 22 carbon atoms.

3. A process in accordance with claim 1 wherein said polyol fatty acid polyesters are intermediate melting polyol fatty acid polyesters.

4. A process in accordance with claim 1 wherein said polyol fatty acid polyesters have a melting point of from about 65° F. to about 100° F.

5. A process in accordance with claim 1 wherein said non-fat milk solids have been subjected to treatment to reduce the level of lactose to yield lactose reduced non-fat milk solids.

6. A process in accordance with claim 5 wherein said lactose reduced non-fat milk solids have from about 0.7% to about 2% lactose on a dry solids basis.

7. A process in accordance with claim 5 wherein said lactose reduced non-fat milk solids are present in said mixture at a level of from about 14% to about 19%.

8. A process in accordance with claim 5 wherein lactose of said non-fat milk solids is reduced by subjecting skim milk to ultrafiltration.

9. A process in accordance with claim 1 wherein said mixture is pasteurized prior to said homogenization.

10. A process for preparing a frozen dessert product containing polyol fatty acid polyesters, water, an emulsifier, non-fat milk solids, a carbohydrate sweetener, optional triglyceride fat, optional corn syrup solids, and an optional stabilizer, said method comprising forming a mixture of a portion of said polyol fatty acid polyesters a portion of said water, and said emulsifier, subjecting said mixture to a first homogenization at a pressure of at least 5,000 psi to form an oil-in-water emulsion, combining said oil-in-water emulsion with the remaining components of said frozen dessert product including the other portion of said polyol fatty acid polyesters and the other portion of said water, and subjecting said combined components to a second homogenization at a pressure below 3,000 psi.

11. A process in accordance with claim 10 wherein said portion of said polyol fatty acid polyesters in said oil-in-water emulsion is from about 50% to about 80% of the total polyol fatty acid polyesters in said frozen dessert product.

12. A process in accordance with claim 10 wherein said portion of said water in said mixture is from about 50% to about 80% of the total water in said frozen dessert product.

13. A process in accordance with claim 10 wherein from about 40% to about 60% of said non-fat milk solids are present in said mixture.

14. A process in accordance with claim 1 wherein said carbohydrate sweetener is from about 40% to about 60% sucrose and from about 60% to about 40% of corn syrup solids having a DE of from about 20 to about 32 based on the total level of sweetener present in said frozen dessert product.

15. A process in accordance with claim 10 wherein said carbohydrate sweetener is from about 40% to about 60% sucrose and is present in the mixture prior to said first homogenization.

16. A process in accordance with claim 1 wherein said homogenization is at a pressure of from about 8,000 psi to about 15,000 psi.

17. A process in accordance with claim 3 wherein said homogenization is at a pressure of from about 8,000 psi to about 15,000 psi.

18. A process for preparing a frozen dessert product, said process comprising:
   (a) forming a mixture of from about 3% to about 20% polyol fatty acid polyesters having at least 4 fatty acid ester groups, from 0 to about 10% of triglyceride fat, from about 10% to about 19% of non-fat milk solids, from 0 to about 15% of corn syrup solids, from about 6% to about 15% of a carbohydrate sweetener, from 0 to about 0.7% of stabilizer, from about 0.003% to about 0.007% of an emulsifier, from about 0.03% to about 0.3% of a polyphosphate complexing salt, and from about 50% to about 75% water;
   (b) subjecting said mixture to homogenization at a pressure of at least about 5,000 psig; and
   (c) freezing said homogenized mixture with aeration to provide a frozen dessert product which is creamy and not grainy in texture.

19. A process in accordance with claim 18 wherein said polyol polyesters are intermediate melting polyol polyesters.

20. A process in accordance with claim 18 wherein said mixture is pasteurized prior to said homogenization.

* * * * *